J. D. WATTERS.
Fastening and Releasing Device for Cattle Stalls.

No. 215,418. Patented May 13, 1879.

WITNESSES:
W. W. Hollingsworth
Edw. W. Byrn.

INVENTOR:
Jas. D. Watters
BY
ATTORNEYS.

UNITED STATES PATENT OFFICE.

JAMES D. WATTERS, OF BEL AIR, MARYLAND.

IMPROVEMENT IN FASTENING AND RELEASING DEVICES FOR CATTLE-STALLS.

Specification forming part of Letters Patent No. 215,418, dated May 13, 1879; application filed February 12, 1879.

*To all whom it may concern:*

Be it known that I, JAMES D. WATTERS, of Bel Air, in the county of Harford and State of Maryland, have invented a new and Improved Fastening and Releasing Device for Cattle-Stalls; and I do hereby declare that the following is a full, clear, and exact description of the same, reference being had to the accompanying drawings, forming part of this specification, in which—

Figure 1:
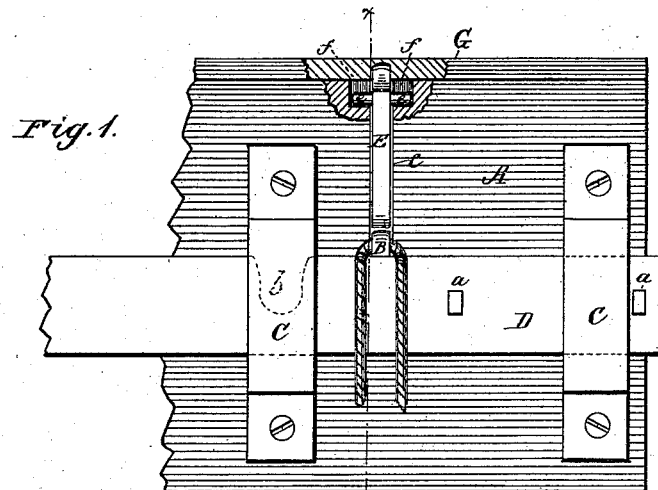
Figure 2:
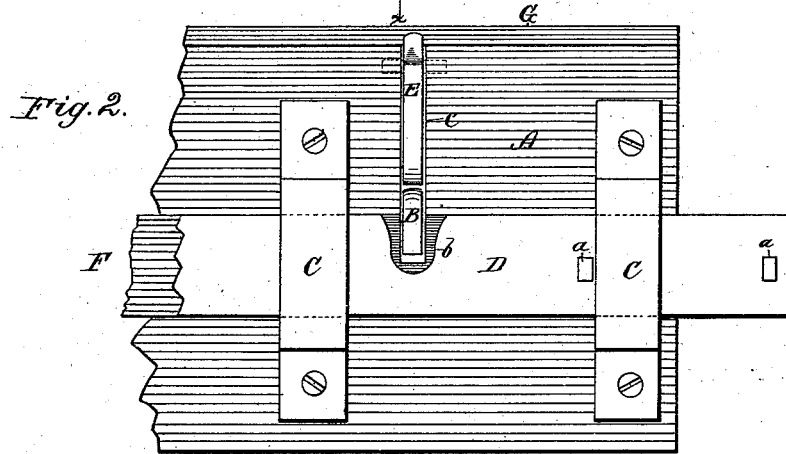
Figure 3:
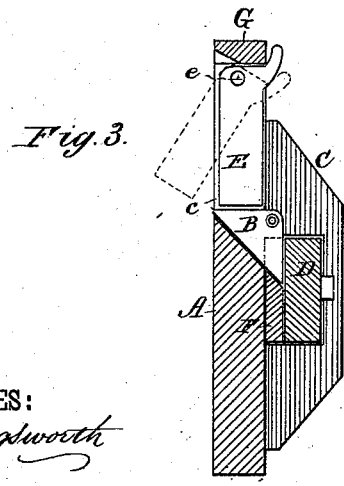

Figure 1 is a front view of a portion of the trough, showing the devices applied. Fig. 2 is a similar view, showing the continuous bar in another position. Fig. 3 is a vertical section through the line $x\ x$ of Fig. 1.

My invention has reference to a device for securing cattle and horses in their stalls, and it contemplates not only means for fastening or unfastening individually any one animal, but means also for simultaneously releasing all of the animals, which function of my device has special value in cases of fire, when the lack of time and excitement of the animals would preclude their individual release.

My devices consist of a detachable bit or key, designed to be permanently attached to the neck of the animal by a chain, rope, or strap, and adapted to be seated in a recess in the front board of the trough, and there securely held by the joint action of a gravity-catch and a continuous bar, so that the key may be released from its seat either by deflecting the catch, as would be required when the animals are to be separately released, or the release of all of the animals effected simultaneously by a movement of the continuous bar extending through all the stalls.

In the drawings, A represents the front board of the trough or head-wall of the stall, which is made preferably of one and one-half inch stuff. In each stall in this board is formed a vertical recess, c, having an inclined bottom, running out into the stall. In the upper part of this recess is pivoted the gravity-catch or detent E, whose lower end extends down into the recess just far enough to leave a triangular chamber, adapted to receive the bit or key to be secured. B is the bit, which is constructed in the form of a right-angled triangle, and is attached to a chain or rope about the animal's neck, which chain is secured to the bit at its right angle. C C are keepers, arranged upon both sides of the recess and embracing a horizontal continuous bar, D, which extends the full length of all of the stalls. This bar D has a longitudinal movement in its keepers, which movement is defined or limited by stops $a'$, and has also open spaces or slots $b$, which may be brought into or out of registration with the recesses. When this bar is at the end of one of its movements, as defined by the stops $a$, said slot $b$ is directly in front of the recess; but when the bar is in its other position, as defined by the stop $a$, the slot is housed in one of the keepers, and a solid portion of the bar is in front of the recess. Now, supposing the bar D to be in front of the recess, as in Fig. 1, in adjusting and manipulating the fastening, the bit or key B is inserted by pushing the gravity-catch out of the way, as in dotted lines, Fig. 3, and dropping the bit in the subjacent recess. The bit then rests in said recess, with its long side or hypotenuse on the inclined bottom of the recess, its front edge abutting against the bar D, and its upper edge abutting vertically against the lower end of the gravity-catch E.

In this position, it will be seen that the bit is securely held, and no amount of tugging will release it.

Now, when it is desired to release the animal or animals, this may be accomplished in two ways. If only a portion are to be released, or it is desired to release them separately, a slight pull upon the upward extension of the gravity-catch throws its lower end to the rear and allows the bit to rise and be withdrawn from its seat. If, however, it is desired to loosen the animals as quickly as possible, as in case of fire, pressure is applied to the end of the bar D, and said bar moved longitudinally until its slots $b$ are directly in front of the several recesses in the several stalls. The bits then having all resistance removed from their front edges are free to be pulled out, and the animals being simultaneously freed can pass out in a body.

The bar D, it will be perceived, is backed by a piece, F. The object of this is to give a corner at which the right angle of the bit projects, so as to permit the chain or rope to pass through.

When the trough or wall to which the devices are secured is made of heavy boards—about two inches, for instance, in thickness—the piece F may be dispensed with, and a concavity formed at the edges of the recess, to give passage to the chain.

Constant tugging of the animal in the stall may cause more or less wear in the rear side of the bar D, against which the key or bit abrades; and if a seat were thus worn in said bar it might preclude the longitudinal movement of the same. To prevent this, I prefer to line the back side of the bar D with metal at this point.

In modifying my invention, instead of using a slotted bar having a longitudinal movement, as shown, I may employ a solid bar, and in removing it from its position in front of the bits give it a downward lateral movement.

In constructing and applying the gravity-catch or detent E, I cast it with trunnions $e\ e$ at the top. The trough A is then sawed out to form the recess, and seats $f\ f$ mortised in the edges of the recess for the trunnions. The trunnions are next inserted, and the recess then closed at the top by the fastening on of a separate strip, G, which retains the gravity-catch in place.

Having thus described my invention, what I claim as new is—

1. A detachable bit or key connected to the chain or rope of the animal, in combination with the trough or wall having a recess, with a bearing-surface in front, and a gravity-catch pivoted in said recess, and adapted to hold said key or permit it to be released by being deflected, substantially as described.

2. A detachable bit or key, combined with a recessed trough or wall, a pivoted gravity-catch, and an adjustable continuous bar, substantially as described.

3. The triangular bit or key B, combined with a recessed trough or wall, the pivoted gravity-catch E, and the longitudinally-moving and slotted bar D, substantially as and for the purpose described.

The above specification of my invention signed by me this 5th day of February, 1879.

JAS. D. WATTERS.

Witnesses:
   EDW. W. BYRN,
   SOLON C. KEMON.